P. L. BARRENQUY.
TAPPING KNIFE FOR RUBBER TREES.
APPLICATION FILED JUNE 13, 1910.
991,127.
Patented May 2, 1911.
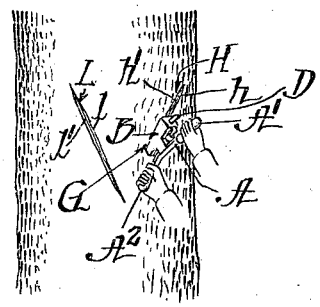
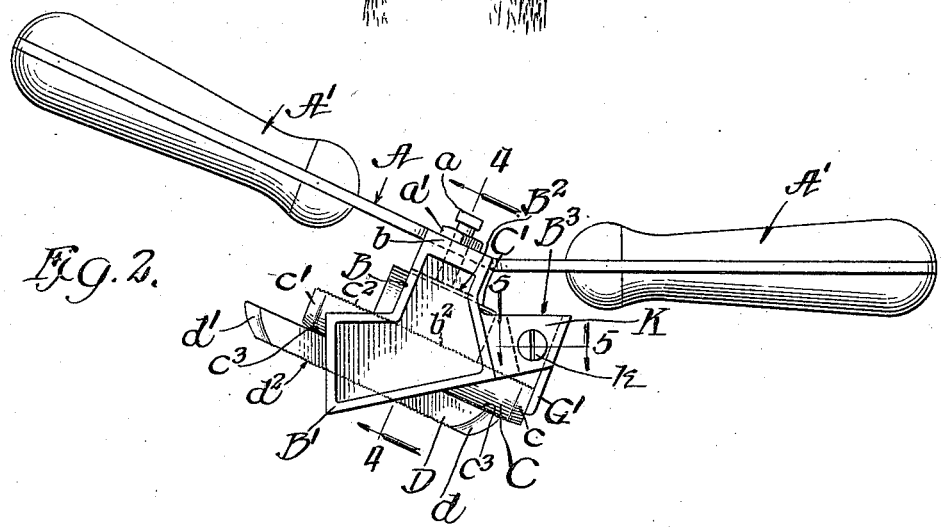
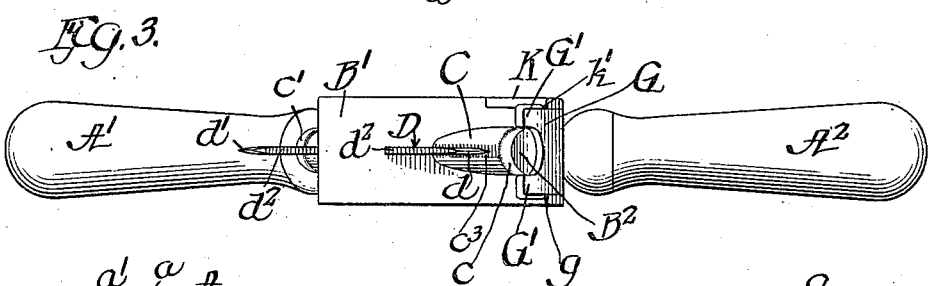
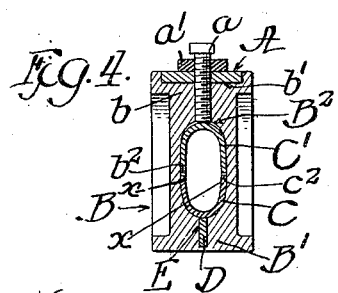
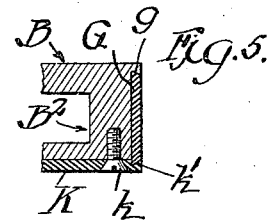
Witnesses:
Inventor
Pablo L. Barrenquy
by Poole & Brown
Attys

UNITED STATES PATENT OFFICE.

PABLO L. BARRENQUY, OF EL SALTO DE AGUA, MEXICO.

TAPPING-KNIFE FOR RUBBER-TREES.

991,127. Specification of Letters Patent. Patented May 2, 1911.

Application filed June 13, 1910. Serial No. 566,587.

*To all whom it may concern:*

Be it known that I, PABLO L. BARRENQUY, a citizen of Mexico, and a resident of El Salto de Agua, in the State of Chiapas, Mexico, have invented certain new and useful Improvements in Tapping-Knives for Rubber-Trees; and I do hereby declare that the following is a full, clear, and exact description thereof, reference being had to the accompanying drawings, and to the letters of reference marked thereon, which form a part of this specification.

This invention relates to an improvement in tapping knives for rubber trees and the like, and its object is to provide a knife which will, with one operation, make a groove in the cortex or outer bark, and at the same time an incision or cut through the inner bark or cambium, thus penetrating through to the space from which the sap or caoutchouc flows.

The invention consists in the combination of elements hereinafter described and more particularly pointed out in the appended claims.

In the drawings:—Figure 1 is a front elevation of a tree showing my improved knife in use. Fig. 2 is a side elevation of the knife. Fig. 3 is a bottom plan view of the same. Fig. 4 is a cross-section through Fig. 2 on the line 4—4 thereof. Fig. 5 is a partial horizontal section through Fig. 2 on the line 5—5 thereof. Fig. 6 is a cross-section through a portion of a tree showing the grooves and cut made by the knife. Fig. 7 is a plan view of the groove-forming blade.

My improved tapping knife comprises a handle bar A, a blade carrier B, a rounded gouging or groove-forming blade C, and a knife or incisor blade D. The carrier B is in the form of a slotted block provided with an angular projection $b$ to which the handle bar A is attached. Said angular projection $b$ extends at right angles to the longitudinal axis of the slot $B^2$ extending through the block and is provided on its upper end with a flat groove $b^1$ to receive the handle bar A which is in the form of a broad, flat bar with handle sections $A^1$, $A^2$ of any suitable material, as wood, bolted to the opposite sides of said bar at each end. The slot $B^2$ opens through the base $B^1$ of the block and has a rounded bottom to receive and support the bottom of the rounded blade C which projects at one end through the slot beyond the base of the block. Located below said slot is a narrow slot E which opens into the first named slot and which receives and retains the incisor blade D, said blade being confined between the bottom of the slot E and the lower face of the curved blade C.

The angular extension $b$ is slotted, to receive a saddle $C^1$ formed in cross-section like the blade C, but shorter and placed in inverted position with its downwardly projecting margins in engagement with the upwardly projecting side margins of the blade. The marginal engaging edges of the saddle and of the blade C are preferably serrated as shown at $b^2$, $c^2$ in order to prevent slippage between them when the tool is operated. The saddle is held in engagement with the blade to lock it in position by means of a set screw $a$ which passes through the handle bar A, and the top of the angular extension $b$, and engages the top rounded part of said saddle. A nut $a^1$ on the set screw engages the top of the handle bar and serves the double purpose of retaining said handle bar in position and as a jam nut for the set screw.

The rounded blade C is provided with cutting edges $c$, $c^1$ at its opposite ends and the incisor blade likewise is provided with cutting edges $d$, $d^1$ so that they may be each reversed when one of their edges becomes dulled from use. The bottom of the rounded blade is preferably provided with serrations $c^3$ to afford frictional engagement with the bottom of the rounded slot $B^2$ and with the upper edge of the incisor blade D, which is also provided on its lower edge with serrations $d^2$ to afford frictional engagement with the bottom of its slot E.

To determine the depth of the groove cut by the rounded blade C, I prefer to provide a gage as follows: The forward end $B^3$ of the block terminates in a plane at right angles to the central axis of the blade C and is provided on one vertical edge with an overhanging flange $g$. G is a gage plate having depending tongues $G^1$, $G^1$ which lie on each side of the forward cutting edge of the blade C. The body of said plate bears against the forward end $B^3$ of the block with one edge engaging under the overhanging flange $g$ and the other edge engaged by the projecting end of a plate K which is let into the face of the block B and secured in place by a screw $k$. It is apparent that the lower ends of the tongues $G^1$, $G^1$ will, by their distance above the plane of the bottom of the rounded knife C, determine the depth of the cut of said knife. The end of the plate K is preferably notched, as shown at $k^1$ Fig. 3, so as to engage the bottom of the gage plate as well as its edge, thus securely clamping it in place. In order to provide room for the ready discharge of the chip cut by the rounded or U-shaped blade C, its side walls $x$, $x$ are preferably formed with a slight upward and outward flare throughout the length of the blade. The handle members $A^1$, $A^2$, secured to the handle bar A, are arranged at an angle to each other for convenience in manipulating the knife.

In operation the handles are grasped by the two hands and the gage plate G caused to engage the outer bark or cortex of the rubber tree. The tapping knife is drawn sharply downward, at an angle to the vertical, leaving a cut L which consists of a rounded groove $l$ through the outer bark or cortex, and a slit or cut $l^1$ through the cambium. The result is a rounded trough or groove cut in the outer bark and opening through a deep incision through the cambium to the inner trunk of the tree. A similar cut is made, as indicated at H, forming a groove $h$ and a cut $h^1$ also at an angle to the vertical and connecting with the other trough at the bottom where the two trough-like grooves unite. The caoutchouc flows through the cuts $l^1$ and $h^1$, respectively, into the grooves $l$ and $h$ and then through said grooves to the V-shaped notch at their junction, from which it may be collected by means of a pail or other device of the kind. The chip passes through the channel inclosed by the blade C and the saddle $C^1$.

It is apparent that my improved device may be modified in several ways without departing from the spirit of my invention and I, therefore, do not wish to be limited to the details of construction illustrated and described except as pointed out in the appended claims.

I claim as my invention:—

1. A tapping knife for trees comprising a gouging blade adapted to cut a groove through the cortex, an incisor blade adapted to cut through the cambium, the two blades being arranged to act simultaneously, means for holding said incisor and gouging blades in operative relation, and a handle for operating said blades.

2. A tapping knife for trees comprising a gouging blade adapted to cut a groove, an incisor blade adapted to cut a slit below and in communication with said groove, the two blades being arranged to act simultaneously, a holding member adapted to maintain said blades in operative relation, and a handle member secured to said holding member.

3. A tapping knife for trees comprising a gouging blade adapted to cut a groove, an incisor blade adapted to cut a slit below and in communication with said groove, the two blades being arranged to act simultaneously, a holding member adapted to maintain said blades in operative relation, means for adjusting said blades with reference to each other and to said holding member, and a handle member secured to said holding member.

4. A tapping knife for trees comprising a gouging blade adapted to cut a groove, an incisor blade adapted to cut a slit below and in communication with said groove, the two blades being arranged to act simultaneously, a holding member adapted to maintain said blades in operative relation, a gage adapted to limit the cut of said gouging blade and secured to said holding member, and a handle member secured to said holding member.

5. A tapping knife for trees comprising a gouging blade adapted to cut a groove, an incisor blade adapted to cut a slit below and in communication with said groove, the two blades being arranged to act simultaneously, a holding member adapted to maintain said blades in operative relation, a gage adapted to limit the cut of said gouging blade secured to said holding member, means for adjusting the position of said gage, and a handle member secured to said holding member.

6. A tapping knife for trees comprising a gouging blade adapted to cut a groove through the cortex, an incisor blade adapted to cut a slit through the cambium, the gouging blade extending in advance of the incisor blade, and the two blades being arranged to act at the same time, a holding member adapted to maintain said blades in operative relation, and a handle member secured to said holding member.

7. A tapping knife for trees comprising a gouging blade adapted to cut a groove, an incisor blade adapted to cut a slit below and in communication with said groove, the two blades being arranged to act simultaneously and the gouging blade being arranged slightly in advance of the incisor blade, a holding member comprising a block having slots formed therein to receive said gouging and incisor blades, said slots opening at one end through the base of said block, means for adjustably securing said blades within said block, and a handle member secured to said block.

8. A tapping knife for trees comprising a gouging blade adapted to cut a groove, an incisor blade adapted to cut a slit below and in communication with said groove, said gouging blade being arranged slightly in advance of said incisor blade, and the two blades being arranged to act simultaneously a holding member comprising a block having slots therein opening at one end through the base thereof to receive said blades, a saddle located in the slot of said block having downwardly extending edges engaging the upturned edges of said gouging blade, means for clamping the parts together, a gage adjustably secured to said block having depending parts located on each side of said gouging blade and adapted to determine the depth of cut thereof, and a handle member secured to said block.

In testimony, that I claim the foregoing as my invention I affix my signature in the presence of two witnesses, this eighth day of June A. D. 1910.

PABLO L. BARRENQUY.

Witnesses:
FREDERIC T. BUSCH,
WALLACE A. ARIEL.

Copies of this patent may be obtained for five cents each, by addressing the "Commissioner of Patents, Washington, D. C."